US008781898B1

(12) United States Patent
Yagnik

(10) Patent No.: US 8,781,898 B1
(45) Date of Patent: Jul. 15, 2014

(54) LOCATION QUERY TARGETING

(75) Inventor: Niyati Yagnik, Mountain View, CA (US)

(73) Assignee: Google Inc., Mountain View, CA (US)

(*) Notice: Subject to any disclaimer, the term of this patent is extended or adjusted under 35 U.S.C. 154(b) by 55 days.

(21) Appl. No.: 13/307,493

(22) Filed: Nov. 30, 2011

Related U.S. Application Data

(60) Provisional application No. 61/447,988, filed on Mar. 1, 2011.

(51) Int. Cl.
*G06Q 10/00* (2012.01)
*G06Q 30/00* (2012.01)

(52) U.S. Cl.
USPC .................................................... 705/14.54

(58) Field of Classification Search
USPC ............... 705/14.4, 14.5, 14.52, 14.54, 14.73
See application file for complete search history.

(56) References Cited

U.S. PATENT DOCUMENTS

| 6,144,944 | A  | * | 11/2000 | Kurtzman et al. | 705/14.54 |
|---|---|---|---|---|---|
| 7,426,507 | B1 | * | 9/2008  | Patterson       | 1/1       |
| 7,987,195 | B1 | * | 7/2011  | Li et al.       | 707/765   |
| 8,234,265 | B1 |   | 7/2012  | Yagnik          |           |
| 2005/0108213 | A1 | * | 5/2005 | Riise et al.    | 707/3     |
| 2008/0086356 | A1 | * | 4/2008 | Glassman et al. | 705/10    |
| 2008/0243611 | A1 | * | 10/2008 | Delli Santi et al. | 705/14 |
| 2009/0006207 | A1 | * | 1/2009  | Datar et al.    | 705/14    |
| 2011/0264516 | A1 | * | 10/2011 | Lang et al.     | 705/14.46 |
| 2012/0166468 | A1 | * | 6/2012  | Gupta et al.    | 707/768   |

OTHER PUBLICATIONS

Rosie Jones, Benjamin Rey, Omid Madani, and Wiley Greiner. Generating Query Substitutions. International Workld Wide Web Conference Committee (IW3C2). WWW 2006, May 23-26, 2006, Edinburgh, Scotland.*
Filip Radlinski, Andrei Broder, Peter Ciccolo, Evgeniy Gabrilovich, Vanja Josifovski, Lance Riedel. Optimizing Relevance and Renenue in Ad Search: A Query Substitution Approach. SIGIR '08, Jul. 20-24, 2008, Singapore.*

* cited by examiner

*Primary Examiner* — Stephanie Delich
(74) *Attorney, Agent, or Firm* — Fish & Richardson P.C.

(57) ABSTRACT

Methods, systems, and apparatus, including computer programs encoded on a computer storage medium, for selecting content items for presentation. In one aspect, a method includes receiving a content item request that references a geographic location. A set of targeted phrases for the geographic location are received. The set of targeted phrases specify one or more targeted phrases that are each specified as a targeting criterion for at least a threshold number of content items for which a reference to the geographic location is also specified as a targeting criterion. A set of targeted queries for the geographic location are selected. Eligible content items are selected based on the set of targeted queries. In turn, data that cause presentation of at least one of the eligible content items are provided.

20 Claims, 4 Drawing Sheets

US 8,781,898 B1

LOCATION QUERY TARGETING

BACKGROUND

Cross-Reference to Related Applications

This application claims the benefit under 35 U.S.C. §119 (e) of U.S. Patent Application No. 61/447,988, entitled "Location Query Targeting," filed Mar. 1, 2011, which is incorporated herein by reference in its entirety.

BACKGROUND

This specification relates to data processing and generating targeting data.

The Internet provides access to a wide variety of resources. For example, video and/or audio files, as well as web pages for particular subjects or particular news articles, are accessible over the Internet. Access to these resources presents opportunities for distribution of targeted content items (e.g., targeted advertisements) with the resources. For example, a web page can include content item slots in which content items, such as advertisements, can be presented. A content item slot is a portion of a resource in which content items are selectively presented. For example, a resource can include a code snippet that includes instructions for obtaining a content item for presentation in a specified portion of the resource. Content item slots can be defined in the resource itself or defined for presentation with a resource, for example, in a separate browser window.

The content items that are selected for presentation in the content item slots can be provided by content providers (e.g., advertising providers) and/or selected through an auction. For example, content providers can provide bids specifying amounts that the sponsors are respectively willing to pay for presentation of their content. In turn, an auction can be performed, and content items can be selected for presentation based, at least in part, the bids, the relevance of the respective content items to resource content that is presented on the resource in which the content item slot is defined, and/or the relevance of the respective content items to information that is included in a request for content items.

The relevance of the respective content items relative to resource content and/or the information that is included in the request can be based, for example, on a measure of similarity (e.g., cosine similarity measure or outcome of a clustering technique) between the content item and the resource content or request information. Some content providers target distribution of their content items using targeting criteria, such as targeting keywords to increase the likelihood that the content item will be presented with content to which the content item is relevant. For example, a search query that is received from a user device can be required to have at least a minimum specified similarity to the targeting keyword for a content item in order for the content item to be eligible for distribution with a responsive search results page. However, it can be difficult for a content provider to anticipate every search query for which the content provider wants their content item to be eligible for distribution.

SUMMARY

In general, one innovative aspect of the subject matter described in this specification can be embodied in methods that include the actions of receiving a content item request including search query data that specify a location phrase that was specified in a search query and that references a geographic location; receiving a set of targeted phrases for the geographic location, the set of targeted phrases specifying one or more targeted phrases that are each specified as a targeting criterion for at least a threshold number of content items for which a reference to the geographic location is also specified as a targeting criterion; selecting a set of targeted queries for the geographic location, each targeted query being a combination of one of the targeted phrases specified by the set of targeted phrases for the geographic location and a reference to the geographic location; selecting eligible content items based on the set of targeted queries, each eligible content item being a content item having targeting criteria that are matched by one or more of the targeted queries; and providing data that cause presentation of at least one of the eligible content items. Other embodiments of this aspect include corresponding systems, apparatus, and computer programs, configured to perform the actions of the methods, encoded on computer storage devices.

These and other embodiments can each optionally include one or more of the following features. Methods can further include the actions of for each of a plurality of geographic locations: identifying content items that are targeted to the geographic location; identifying non-geographic phrases that are used in conjunction with a reference to the geographic location to target the content items; for at least one of the non-geographic phrases: determining that at least the threshold number of the identified content items are targeted using the at least one non-geographic phrase an a reference to the geographic location; and defining the at least one non-geographic phrase as a targeted phrase in the set of targeted phrases for the geographic location.

Receiving a set of targeted phrases for the geographic location can further include the action of receiving a set of targeted phrases that reference pre-defined local tourist attractions for the geographic location. Selecting a set of targeting queries for the search query can include the actions of classifying the search query as an attraction query that is requesting information about the pre-defined local tourist attractions for the geographic location; and selecting the set of targeting queries to include targeting queries that are a combination of the set of targeted phrases that reference the local tourist attractions for the geographic location.

Receiving a set of targeted phrases for the geographic location can further include the actions of receiving commercial phrases for the geographic location, the commercial phrases being phrases that have caused presentation of at least a threshold number of content items on a per-content-item request basis.

Methods can further include the actions of identifying a commercial search query that includes both of a reference to the geographic location and a commercial search term, the commercial search query being a search query for which responsive search results pages include at least a minimum number of advertisements per-page, the commercial search term being a commercial phrase that is included in a search query; and selecting the commercial search term as a targeted phrase that is included in the set of targeted phrases.

Methods can further include the actions of identifying a non-commercial search query that does not qualify as the commercial search query, the non-commercial search query including a non-commercial search term and a reference to the geographic location; and determining that a similarity score for the non-commercial search term meets a similarity threshold, the similarity score for the non-commercial search term being a measure of similarity between the non-commercial search term and the commercial search term; and associating the non-commercial search query with the commercial search query.

Receiving search query data can include the action of receiving search query data specifying that the non-commercial search query was received; and selecting a set of targeting queries for the search query can include the action of selecting the commercial search query that is associated with the non-commercial search query. Identifying a commercial search query can include the action of identifying a commercial search query for which advertisements that are presented with the responsive search results pages have at least a minimum per-query click rate.

Selecting eligible content items can include selecting eligible advertisements. Providing data that cause presentation of at least one of the eligible content items can include providing data that cause presentation of at least one of the eligible advertisements.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
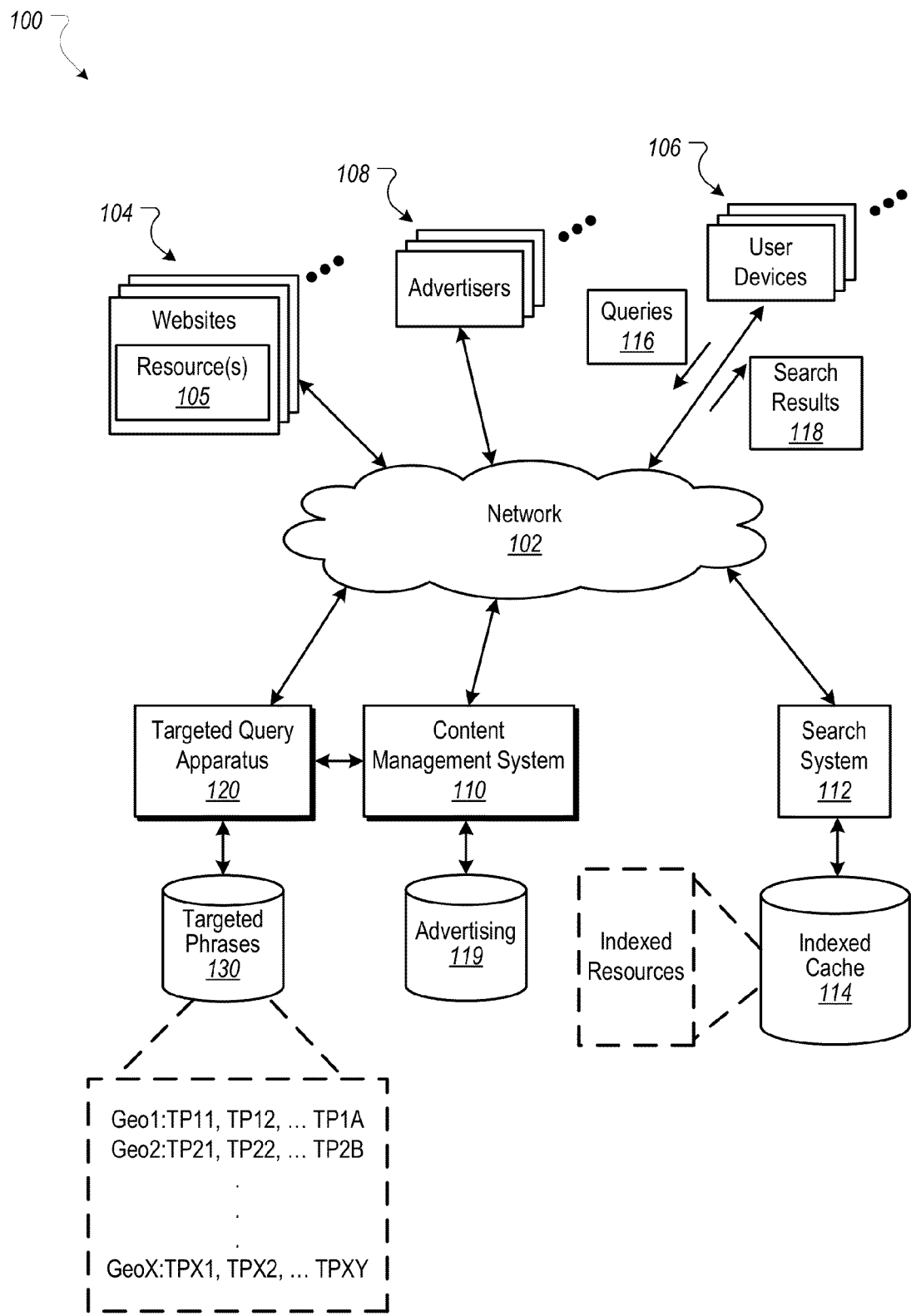
FIG. 1 is a block diagram of an example environment in which a content management system manages content services, including advertising services.

Content items, e.g., advertisements, are selected for presentation based on targeted queries for a geographic location. A targeted query for a geographic location is a search query that specifies both a reference to the geographic location and a targeted phrase for the geographic location. The targeted phrase can be selected from a set of targeted phrases that have been identified as targeted phrases for the geographic location based, for example, on a number of content items that are targeted using the a reference to the geographic location and the targeted phrase. As described in more detail below, other phrases (e.g., attraction phrases) can also be used to create targeted queries for the geographic location. Additionally, commercial queries for the geographic location can be selected as targeted phrases for the geographic location, as described below.

For example, a user may enter a search query such as "visiting San Francisco" into the search field of a web browser. The query includes a reference to the geographic location of "San Francisco," and includes the additional term "visiting." Following submission of the search query, a content management system may receive a request for an advertisement (or another content item) to be presented with search results that are responsive to the search query. Upon receipt of the request, a determination is made that targeted phrases (e.g., "flights," "hotels," "tickets," and "tours") are available for the geographic location San Francisco, and these targeted phrases can be received by the content management system. Using the targeted phrases, the content management system can select (or create) a set of targeting queries with which content items will be selected in response to the request. For example, each of the targeted queries can include one of the targeted phrases and a reference to the geographic location. In turn, the content management system can select an advertisement to be provided in response to the content item request. For example, the selected advertisement can be an advertisement that is targeted to "San Francisco," and "flights."

Using the targeted queries to select content items, such as ads, for a location-based query can improve targeting of content (e.g. advertisements) in response to the location-based query. In some implementations, ads can be targeted for travel-related queries by rewriting the queries into more commercially relevant queries, e.g., queries that can be used to select ads that are more likely to be of interest to the user. Additionally, content providers (e.g., advertisers) can reach more of their target audience with fewer targeting keywords.

The description that follows generally describes an environment in which a query is received that includes a reference to a geographic location. The query can include a geographic phrase referencing the geographic location (e.g., San Francisco) and a non-geographic phrase that includes one or more non-geographic terms (e.g., "visiting"). Some terms such as "visiting" may be terms that are infrequently used by advertisers to target ads. Therefore, additional queries that include the geographic location and a targeted phrase for the geographic location may be more likely to match ads that are relevant to the search query. Targeting advertisements in this manner may facilitate selection of advertisements that are relevant to the user's interests.

FIG. 1 is a block diagram of an example environment 100 in which a content management system 110 manages distribution of content. The example environment 100 includes a network 102, such as a local area network (LAN), a wide area network (WAN), the Internet, or a combination thereof. The network 102 connects websites 104, user devices 106, advertisers 108, and the content management system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts).

The user device 106 is an electronic device that is under control of a user and is capable of requesting and receiving resources over the network 102. Example user devices 106 include personal computers, mobile communication devices, and other devices that can send and receive data over the network 102. The user device 106 typically includes a user application, such as a web browser, to facilitate the sending and receiving of data over the network 102. For example, the user device 106 can be a personal computer running a web browser, a mobile telephone running a WAP browser.

The user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which content items such as advertisements can be presented. Content items can be, for example, units of content presented with search results, banner ads, text ads, video content, audio content, or user visits to an advertiser's web page. These specified portions of the resource or user display are referred to as slots, which can include advertisement slots.

To facilitate searching of these resources, the environment 100 can include a search system 112 that identifies the resources by crawling and indexing the resources provided by the publishers on the websites 104. Data about the resources can be indexed according to (or stored with) a reference to the resource with which the data are associated (i.e., associated with the resource). The indexed and, optionally, cached copies of the resources are stored in a search index 114. Data that are associated with a resource are data that represent content included in the resource and/or metadata for the resource.

User devices 106 can submit search queries 116 to the search system 112 over the network 102. In response, the search system 112 accesses the search index 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link (e.g., a hypertext link) to the resource. An example search result 118 can include a web page title, a snippet of text or a portion of an image extracted from the web page, and the URL of the web page. Search results pages can also include, for example, one or more advertisement slots in which advertisements can be presented.

When a resource 105 or search results 118 are requested by the user device 106, the content management system 110 receives a request for content items (e.g., advertisements) to be provided with the resource 105 or search results 118. For example, the request for advertisements can include characteristics of the advertisement slots that are defined for the requested resource or search results page, and can be provided to the content management system 110.

For example, a reference (e.g., URL) to the resource for which the advertisement slot is defined, a size of the advertisement slot, and/or media types that are available for presentation in the advertisement slot can be provided to the content management system 110. Similarly, keywords (i.e., one or more words that are associated with content) associated with a requested resource ("resource keywords") or a search query 116 for which search results are requested can also be provided to the content management system 110 to facilitate identification of advertisements that are relevant to the resource or search query 116.

Based on data included in the request for advertisements, for example, the content management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries 116. In some implementations, advertisements having targeting keywords that match the resource keywords or the search query 116 are selected as eligible advertisements by the content management system 110. When a targeting keyword matches a search query 116 or a resource keyword and the eligible advertisement associated with that targeting keyword is presented to a user (i.e., receives an impression), the targeting keyword is considered to have caused presentation of the eligible advertisement.

A targeting keyword can match a resource keyword or a search query 116 by having the same textual content ("text") as the resource keyword or search query 116. For example, an advertisement associated with the targeting keyword "hockey" can be an eligible advertisement for an advertisement request including the resource keyword "hockey." Similarly, the advertisement can be selected as an eligible advertisement for an advertisement request including the search query "hockey."

A targeting keyword can also match a resource keyword or a search query 116 by having text that is identified as being relevant to a targeting keyword or search query 116 despite having different text than the targeting keyword. For example, an advertisement having the targeting keyword "hockey" may also be selected as an eligible advertisement for an advertisement request including a resource keyword or search query for "sports" because hockey is a type of sport, and therefore, is likely to be relevant to the term "sports" (e.g., based on the outcome of clustering techniques or other techniques for determining phrase similarity).

Advertisers (or other content item providers) can specify a level of match that is required between targeting keywords that are used to distribute their advertisements (or other content items) and a resource keyword and/or a search query 116. For example, an advertiser can specify a targeting keyword as a broad match keyword, a phrase match keyword, or an exact match keyword. Broad match keywords are keywords that are matched by phrases (i.e., one or more words) that include one or more same words as the broad match keywords. Broad match keywords can also be matched by phrases that include stubs, synonyms, various alternative forms of the broad match keywords (e.g., past tense, gerunds, future tense), and/or terms that are relevant to a same topic or concept as the broad match targeting keyword (e.g., based on term clustering techniques). For example, the broad match keyword "sports equipment," may be matched by "tennis equip" because this phrase includes the word "equipment," which is included in the broad match keyword. In this example, the phrase "hockey" can also match "sports equipment" because hockey is a type of sport, and therefore, is relevant to the term "sports."

Phrase match keywords are keywords that are matched by phrases that include at least one same word as the phrase match keyword. The phrases that match a phrase match keyword can include additional words that are not included in the phrase match keyword. For example, if "sports equipment" is designated as a phrase match keyword, the phrases "sports," "equipment," "sports equipment" and "new sports equipment" will match the phrase match keyword.

Exact match keywords are keywords that are matched by phrases that include the exact same words as the exact match keywords. For example, the exact match keyword "hockey sticks" is matched by the phrase "hockey sticks," and is not matched by the phrase "durable hockey sticks" because "durable hockey sticks" includes the word "durable," which is not included in the exact match keyword "hockey sticks."

The content management system 110 selects the eligible advertisements that are provided for presentation in advertisement slots (i.e., content item slots in which advertisements are presented) of a search results page (or another resource) based on results of an auction. For example, advertisers can provide bids specifying amounts that the advertisers are respectively willing to pay for presentation of their advertisements. In turn, an auction can be performed and a set of the eligible advertisements can be selected for presentation according to the bids that were received from the advertisers. When one eligible advertisement is being selected for presentation in a single advertisement slot, the eligible advertisement that is selected for presentation in the advertisement slot can be the advertisement for which the highest bid was received and/or a highest auction score (i.e., a score that is computed as a function of a bid and/or an advertisement quality measure) was computed. When multiple eligible advertisements are being selected for presentation, the selected advertisements can be those eligible advertisements for which the highest bids were received (i.e., among all bids for eligible advertisements) and/or have the highest auction scores.

Targeting keywords and other data that are used to selectively distribute content items, such as advertisements, can be stored in an advertising data store 119. As used throughout this document, the terms "selectively distributed" and "targeted" are used interchangeably to refer to content items for which distribution is conditioned on satisfaction (e.g., matching) of targeting criteria that have been specified for the content items. For example, an advertisement is referred to as being selectively distributed using a targeting keyword when the advertiser has specified the targeting keyword as a targeting criterion for the advertisement, irrespective of whether the advertisement is actually distributed based on that targeting keyword. Thus, selective distribution of a content item does not require that the content item actually be distributed.

The advertising data store 119 can store references to advertisements (e.g., URLs to the advertisements), advertising campaign parameters that are used to control distribution of the advertisements (e.g., targeting keywords), data representing conditions under which the advertisement was selected for presentation to a user, and data representing actions taken by users in response to presentation of the advertisement. For example, the advertising data store 119 can store targeting keywords, bids, and other criteria with which eligible advertisements are selected for presentation.

The advertising data store 119 can also store user interaction data representing user interactions with presented advertisements (or other content items). For example, when an advertisement is presented to the user, impression data can be stored in the advertising data store 119 representing an advertisement impression (i.e., the presentation of the advertisement at a user device). In some implementations, the impression data are stored in response to a request for the advertisement that is presented. For example, the ad request can include data specifying an anonymized user identifier for a user device (e.g., a cookie), such that anonymized data identifying the user device can be stored in association with the impression data that identify the advertisement(s) that were presented in response to the request.

When a user selects (i.e., clicks or otherwise interacts with) a presented advertisement, interaction data are stored in the advertising data store 119 representing the selection of the advertisement. In some implementations, the interaction data are stored in response to a request for a web page (or another resource) to which the advertisement links (e.g., by way of a hypertext link). For example, the user selection of the advertisement can initiate a request for presentation of a web page that is provided by (or for) the advertiser. The request can include data specifying the anonymized user identifier for the user device, and this data can be stored in the advertising data store 119.

The advertising data store 119 can also include data that specify a quantity of impressions that each advertisement has received, and the quantity of impressions for each advertisement can be delineated, for example, using the keywords that caused the advertisement to receive impressions (e.g., the targeting keywords for the advertisement that were matched by information included in the request). Each impression and user selection can be associated with (i.e., stored with references to and/or indexed according to) the advertisement that was selected and/or the targeting keyword that caused the advertisement to be selected for presentation. Similarly, each impression and user selection can be associated with an anonymized identifier (e.g., cookie identifier) for the device that received the impression and from which the selection was made.

As noted above, it can be difficult for an advertiser (or another content provider) to specify targeting keywords that will be matched by every search query (or resource keyword) for which the advertiser would like their advertisement (or other content item) to be eligible for distribution. For example, different users may use different search queries to search for information about a same topic. For instance, user A, who is searching for resources that provide travel related information (e.g., to plan a vacation), may submit the search queries "San Francisco Hotels," "San Francisco Car Rental," and/or "San Francisco Tours," while user B may use different search phrases such as "Visit San Francisco," or "San Francisco Attractions," to search for similar travel information. These are just a few examples of the various search queries that may be submitted by users to whom a particular advertiser may want their advertisement presented. If the advertiser has not specified targeting keywords that are matched by each of these search queries (or the various other search queries that may be received), then the advertiser may miss out on opportunities to have its advertisement presented to its target audience.

As illustrated by the example above, users that are searching for similar content may use a wide variety of search queries and/or search strategies in an effort to obtain information that will satisfy the users' informational needs. However, there may be a commonality between the search queries and/or search strategies that may be used to determine that these users may have similar informational needs. For example, each of the queries that were received from user A and user B above included the location phrase "San Francisco." Additionally, each of the search queries were somewhat related to tourism or travel, as indicated by the terms "Hotels," "Car Rental," "Tours," etc. As described in more detail below, the commonalities between the search queries can be used to select additional queries (i.e., targeted queries) with which eligible content items can be selected in response to receipt of any of the search queries that exhibit this commonality. Thus, content providers may be able to reach more of their target audience without being required to specify additional targeting keywords.

The environment 100 includes a targeted query apparatus 120 that selects targeted queries for geographic locations. A targeted query for a geographic location is a search query that specifies both a reference to the geographic location and a targeted phrase for the geographic location. For example, assuming that the phrase "flights" is a targeted phrase for the geographic location San Francisco, then "San Francisco flights" would be a targeted search query for San Francisco.

A targeted phrase is a phrase that is specified for targeting (e.g., as specified by an advertiser), and with which at least a threshold number of content items are selectively distributed (i.e., targeted). Thus, not all keywords that a particular advertiser uses for targeting may be a "targeted phrase." The threshold number of content items can be specified as an absolute number of content items (i.e., 5, 10, 20, or 100 content items) or a relative number of content items (i.e., at least 1% of all content items).

The targeted phrases are, in some implementations, identified with respect to geographic locations. In particular, the targeted phrases for a particular geographic location include phrases for which at least a threshold number of content items are selectively distributed (i.e., targeted) using targeting criteria that specify both the targeted phrase and a reference to the particular geographic location. For example, assume that the phrases "flights," "hotels," "tickets," "tours," "packages," "itineraries," and "attractions," are used in conjunction to a reference to San Francisco (e.g., a postal code or latitude/longitude coordinates for San Francisco) to target at least a threshold number (e.g., 10) content items. In this example, the phrases "flights," "hotels," "tickets," "tours," "packages," "itineraries," and "attractions" will be targeted phrases for San Francisco, and can be stored in a targeted phrase data store 130.

In some implementations, the targeted phrases for a particular geographic location can also include references to tourist attractions or other attractions for the geographic location. For example, references to San Francisco-related attractions, such as the terms "Chinatown," "Lombardi Street", "Candlestick Park," "Fisherman's Wharf" "Golden Gate," "Alcatraz" and/or other references to attractions in San Francisco can be included in the targeted phrase data store 130. These terms can also be indexed to a reference to San Francisco in the targeted phrase data store 130. As used here, references to tourist attractions or other attractions are phrases that reference locations that are pre-identified and/or predefined as being tourist attractions or other attractions.

In some implementations, the targeted phrase data store 130 can also specify "commercial" search terms for geographic locations. Commercial search terms (i.e., commercial phrases that are included in search queries) are terms of search queries that on average (or with at least a specified rate) have caused presentation of at least a threshold number of advertisements (e.g., three or more) per-content-item-request or per-page-view. Commercial search terms can also be terms of search queries that have led to at least a threshold number of user interactions (e.g., at least one advertisement conversion or at least one advertisement click). In some implementations, the targeted phrase data store 130 can include a commercial search term table that includes entries for commercial search terms, e.g., indexed according to non-commercial search terms (i.e., search terms that do not qualify as a commercial search terms). The commercial search term tables can be maintained, for example, on a per-geographic location basis.

For example, assume that the search term "visiting" is a non-commercial search term for San Francisco. In this example, the non-commercial search term "visiting" for San Francisco may be an index key for one or more corresponding commercial search terms for San Francisco (e.g., "Golden Gate", "Alcatraz," etc.). In some implementations, non-commercial search terms and corresponding commercial search terms that are indexed to the non-commercial search terms can be selected using clustering techniques to analyze search log data and/or advertising data. For example, if users often enter a query that includes the non-commercial search term "visiting," and then select a search result containing the commercial term "Golden Gate" or submit a new query that include the commercial term "Golden Gate," the terms "visiting," and "Golden Gate" may belong to a same cluster of terms. In this example, the commercial term "Golden Gate" can be indexed to the non-commercial term "visiting," since both terms belong to a same term cluster.

In some implementations, the targeted query apparatus 120 selects the targeted phrases (e.g., TP11 . . . TPXY) for a set of geographic location (e.g., Geo1, Geo2, . . . , GeoX) and stores the targeted phrases and references to the geographic locations in the targeted phrase data store 130. In some implementations, another data processing apparatus selects the targeted phrases for the set of geographic locations. The targeted phrases can be selected based on the number of content items that are targeted using the targeted phrases, as described above. The targeted phrases can also be selected based on an analysis of past queries, analysis of query logs, analysis of targeting keywords, or other techniques. For example, clustering techniques can be used to cluster search query terms and/or targeting keywords that have been identified as relevant to a same geographic location and/or topic. In turn, each of targeting keywords that are included in the cluster can be identified as targeted queries for the geographic location.

As described in more detail with reference to FIG. 2, when the content management system receives a content item request, the content management system 110 and/or the targeted query apparatus 130 can determine whether the request includes a location phrase (i.e., a reference to a geographic location) with which a content item is to be selected. If the request includes a location phrase, the targeted query apparatus 120 selects a set of targeted queries for the geographic location that is referenced the location phrase. For example, if the request includes data specifying that the search query "visit San Francisco" was received from a user device, the targeted query apparatus 120 can select the targeted queries "flights San Francisco," "hotels San Francisco," and other targeted queries for San Francisco using the targeted phrases for San Francisco that are stored in the phrase data store 130. In some implementations, the targeted query apparatus 120 selects the targeted queries by selecting, from the targeted phrase data store 130, each targeted phrase for the geographic location and creating targeted search queries that each includes a reference to the geographic location and one of the selected targeted phrases.

In some implementations, the targeted phrases for a particular location can be identified and/or indexed on a per-topic basis. For example, one set of targeted phrases for San Francisco can be a set of travel targeted phrases in which each targeted phrase has been identified as having at least a minimum specified relevance (e.g., based on clustering techniques, cosine similarity measures, or other measures of relevance or similarity) to travel. When the targeted phrases are identified and/or indexed on a per-topic basis, the set of targeted phrases that are selected by the targeted query apparatus 120 can be one or more sets of targeted phrases that are indexed to a topic to which the search query has at least a threshold relevance (e.g., based on cosine similarity scores, clustering techniques, or other measures of similarity). For example, a single set of targeted phrases that is indexed to a topic to which the search query is most relevant can be selected in response to a content item request that specifies the search query. In another example, multiple sets of targeted phrases that are indexed to topics to which the search query has at least the threshold relevance can all be selected in response to the content item request.

The content management system 120 receives the targeted queries that were selected by the targeted query apparatus 130, and selects a set of eligible content items using the received targeted queries. For example, content management system 110 can select, as the set of eligible content items, each content item having targeting criteria that is matched by at least one of the targeted queries that were selected by the targeted query apparatus and/or additional information (e.g., data specifying the original search query that was received from the user device) that was included in the content item request.

Figure 2:
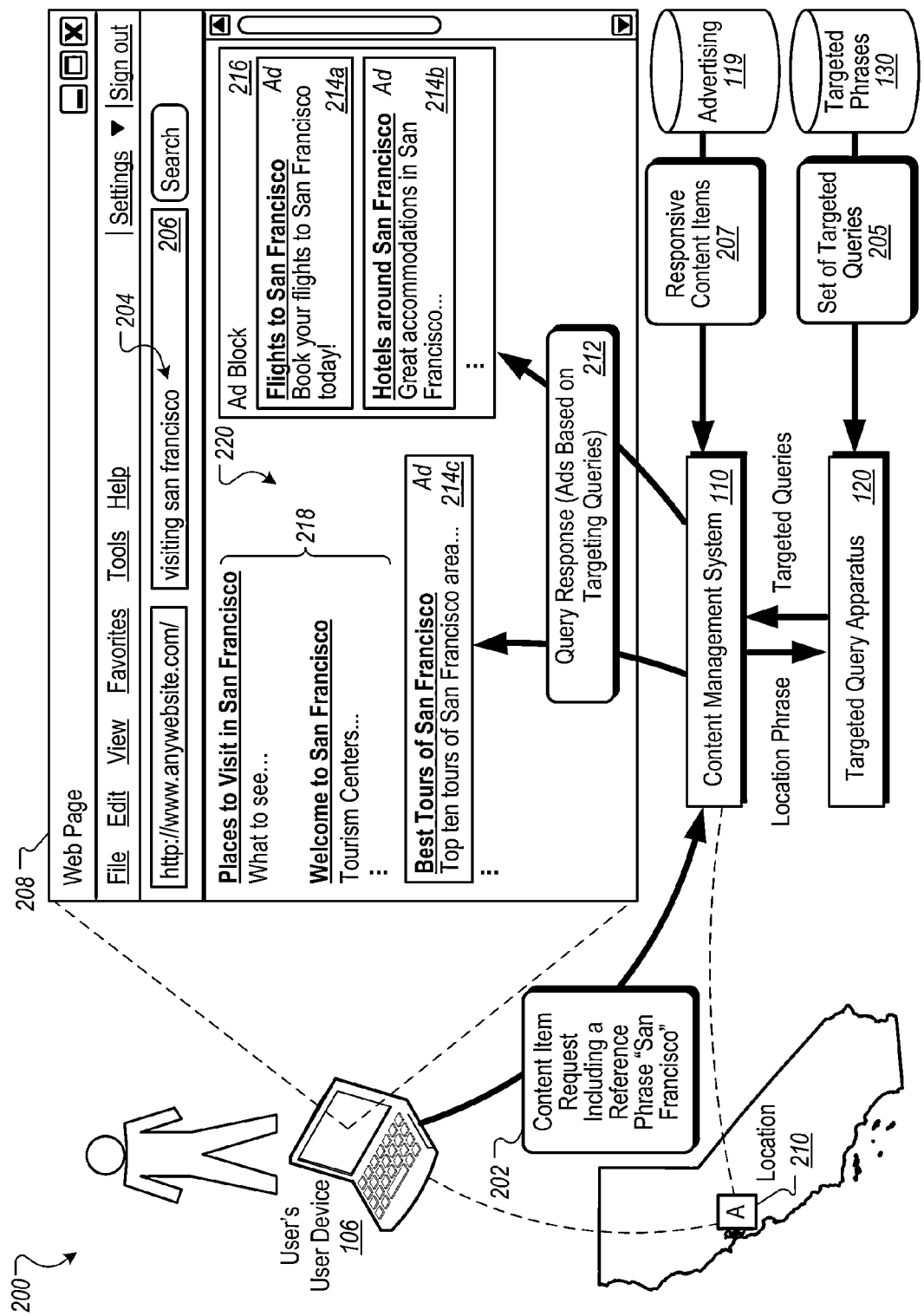
FIG. 2 is a block diagram of an example system for generating advertisements responsive to targeting queries associated with a location phrase.

FIG. 2 is a block diagram of a process flow 200 for providing content items in response to a content item request. In particular, the system 200 is depicted as a block diagram and an associated screenshot that collectively show an example sequence of events for serving ads, such as within the environment 100. The process flow 200 can begin with the receipt of a content item request 202 by the content management system 110 (or by the targeted query apparatus 120). The received content item request 202 includes a location phrase referencing a particular geographic location (e.g., "San Francisco"). For example, content item request 202 can include data specifying that a content item be selected using the phrase "visiting San Francisco" that was entered as a search query string 204 in a search field 206 on a web page 208 (e.g., in a browser executing on the user's user device 106). The search query string 204 includes the location phrase "San Francisco," which references the geographic location San Francisco and a non-geographic phrase "visiting."

In some instances, the non-geographic phrase "visiting" may not be a targeted phrase for the geographic location that is reference by the location phrase. However, the targeted query apparatus 120 can select or generate multiple targeting queries using the location phrase referencing the particular geographic location in combination with targeted phrases for the particular geographic location (e.g., San Francisco) that are stored in the targeted phrase store 130.

As described above, a set of targeted phrases can be selected for each geographic location prior to receipt of the content item request 202. In some implementations, targeted phrases are selected based, at least in part, on the number of content items (e.g., ads) that are targeted (i.e., selectively distributed) using targeting criteria that specify both the targeted phrase and a reference to the geographic location. For example, targeted phrases for San Francisco can include "flights," "hotels" and "museums" when at least a threshold number of advertisements are targeted using those phrases in combination with a reference to San Francisco.

The targeted phrases can be selected on a per-geographic-location basis. For example, while many different advertisers may target advertisements using the targeting keyword "San Francisco Hotel," it may be that no advertisers (or less than the threshold number of hotels) target advertisements using the targeting keyword "Muddy Gap, Wyoming Hotel." Thus, "hotels" may be a targeted phrase for San Francisco and other large cities, but not for other geographic locations. Targeting phrases can be pre-determined and stored, e.g., in the targeted phrase data store 130, and updated over time as needed (e.g., based on counts of ads targeted using those phrases or other criteria).

The content management system 110 can provide the location phrase to the targeted query apparatus 120 and request a set of targeted queries for the geographic location that is referenced by the location phrase. In response to the request, the targeted query apparatus 120 selects a set of targeting queries 205 for the geographic location (e.g., San Francisco). Each of the targeting queries that the targeted query apparatus 120 selects can be a combination of a targeted phrase ("flights,", "hotels," "museums," etc.) and the reference to the geographic location (e.g., San Francisco). As a result, the targeting queries can include "San Francisco flights," "San Francisco hotels," "San Francisco museums," among other potential targeting queries.

The targeted query apparatus 120 provides the targeting queries 205 to the content management system 110. The content management system 110 uses the targeting queries (e.g., "San Francisco flights," "San Francisco hotels," "San Francisco museums,") to select eligible content items for the request. For example, content management system 110 can select content items that for which targeting criteria are matched by the targeted queries as the eligible content items. In turn, the content management system 120 provides one or more responsive content items 207 (e.g., ads for San Francisco flights, motels and/or museums) to the user device 106 in response to the request.

The content management system 110 can provide the selected content items in the form of a query response 212 that includes data that cause presentation of the content items that were selected using the targeted queries. For example, ads 214a-214c can be displayed on the web page 208. As illustrated in FIG. 2, ads 214a and 214b can appear in an ad block 216. Other ads, such as the ad 214c, can be embedded among search results 218, e.g., in a search results area 220 on the web page 208.

Figure 3:
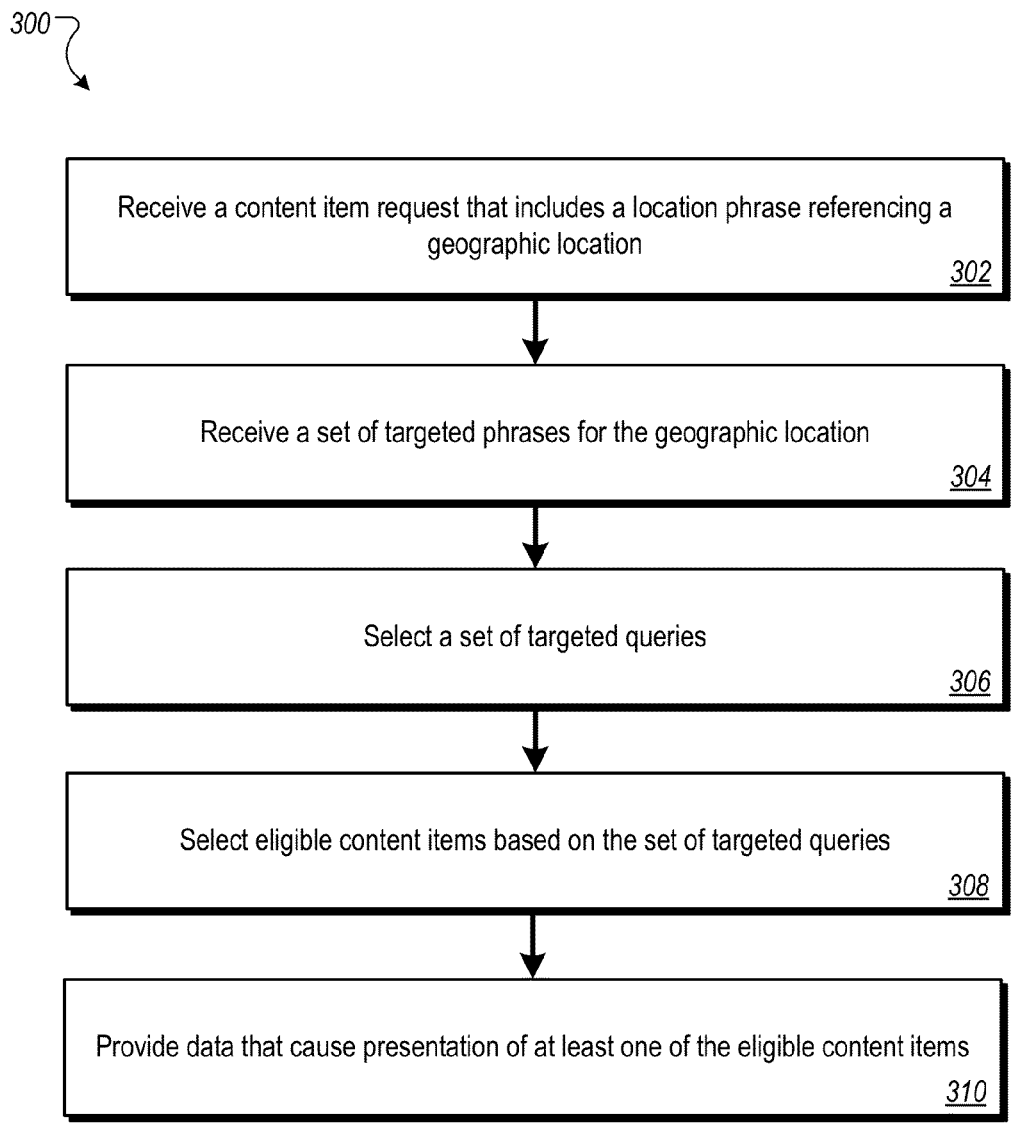
FIG. 3 is a flow chart of an example process for serving content responsive to targeting queries that are generated from a query with a location phrase.

FIG. 3 is a flow chart of an example process 300 for providing content items that are responsive to targeted queries for a geographic location. The process 300 is a process by which search query data that specify that specify a location phrase referencing a geographic location are received. Using the location phrase, a set of targeting queries for the geographic location are selected, and a set of content items are selected using the set of targeting queries. In turn, data that cause presentation of at least one content item from the set of content items are provided The process 300 can be implemented, for example, using the targeted query apparatus 120 and/or the content management system 110 of FIG. 1. The process 300 can also be implemented as instructions stored on computer storage medium such that to enable execution of the instructions by data processing apparatus causing the data processing apparatus to perform the operations of the process 300. FIG. 2 is referenced to provide examples for describing operations of the process 300.

A content item request is received (302). In some implementations, the content item request specifies a location phrase that references a geographic location that was specified by a search query. For example, referring again to FIG. 2, the content management system 110 can receive the content item request 202 that includes the reference phrase "San Francisco" that was included in a search query that was entered at the user's user device 106. In this example "San Francisco" is the location phrase that references the geographic location San Francisco. By way of example, other location phrases that can reference the geographic location San Francisco can include "San Fran," "SF," other nicknames or abbreviations for San Francisco, as well as latitude/longitude coordinates or postal codes that reference San Francisco.

A set of targeted phrases for a geographic location is received (304). In some implementations, the set of targeted phrases are received from a data store that stores a set of targeted phrases for one or more geographic locations. The set of targeted phrases for a particular geographic location can include, for example, targeted phrases for which a number of content items that are selectively distributed (i.e., targeted) using targeting criteria that specify both the targeted phrase and a reference to the geographic location.

In some implementations, the set of targeted phrases for the geographic location is received from a data store that stores targeted phrases for each of a plurality of geographic locations. The set of targeted phrases for each of the geographic locations can be identified for inclusion in the data store, for example, based on an analysis of targeting criteria for a set of content items. For example, for a particular geographic location, the content items that are targeted to the geographic location can be identified. The content items that are targeted to the geographic location can be identified, for example, based on at least one of the targeting criterion for the content item specifying a reference to the particular geographic location.

For each of the content items that are targeted to the geographic location, non-geographic phrases (i.e., phrases that do not reference a particular geographic location or region) that are used in conjunction with the reference to the geographic location are identified. When at least a threshold number of the content items are targeted using a same non-geographic phrase and a reference to the geographic location, the non-geographic phrase is defined as a targeted phrase for the geographic location.

In some implementations, the set of targeted phrases that are received for the geographic location include a set of targeted phrases that reference local tourist attractions for the geographic location. For example, if the geographic location is San Francisco, the set of targeted phrases that are selected can include references to tourist attractions including "Chinatown," "Lombardi Street", "Candlestick Park," "Fisherman's Wharf" "Golden Gate," "Alcatraz" and/or other local tourist attractions for San Francisco. In some implementations, the local tourist attractions for each geographic location can be stored in the targeted phrase data store 130 of FIG. 1 and indexed, for example, by geographic location.

In some implementations, the set of targeted phrases for the geographic location can include commercial search queries for the geographic location. Commercial search queries for the geographic location can be identified based on an analysis of search log data and/or advertising data, as described above. For example, as described above, commercial search queries for a geographic location can include search queries for which at least a threshold number of advertisements are presented with responsive search results pages and/or search queries for which the presented advertisements have at least a minimum per-query click rate. For example, the targeted query apparatus 120 can identify "San Francisco flights" as a commercial search query if previously-presented advertisements on search results pages responsive to the search query "San Francisco flights" have at least a minimum per-query click rate.

Once commercial search queries have been identified for a geographic location, non-commercial queries (i.e., search queries that do not qualify as the commercial search query) that have at least a minimum similarity score relative to at least one of the commercial queries can be indexed or otherwise associated with the at least one non-commercial query.

In turn, this set of commercial and non-commercial queries can be included in the set of targeted phrases for the geographic location. The similarity scores for the non-commercial queries can be determined as described above.

A set of targeting queries is selected for the search query (306). In some implementations, each targeted query is a combination of a targeted phrase from the set of targeted phrases and a reference to the geographic location. For example, the targeted query apparatus 120 can select targeting queries (e.g., "San Francisco flights," "San Francisco hotels," etc.) for the location San Francisco using targeted phrases from the targeted phrase data store 130.

In some implementations, if the search query is classified as an attraction query (i.e., a search query that is requesting information about local attractions for the geographic location), the set of targeting queries are selected to include targeting queries that reference the local tourist attractions for the geographic location. For example, upon receiving a query such as "Visiting San Francisco" the targeted query apparatus 120 can classify the term "Visit" as an attraction term (e.g., based on the term Sites matching a set of pre-identified attraction terms), such that the search query "Visit San Francisco" is classified as an attraction query. In turn, the targeted query apparatus 120 can receive attraction phrases such as "Chinatown," "Lombardi Street," "Candlestick Park," "Fisherman's Wharf," "Golden Gate," and/or "Alcatraz," and select and/or generate targeting queries that include these attraction phrases and a reference to San Francisco. In some implementations, the targeted query apparatus 120 can access a data store that identifies specific terms or phrases that have been classified as and/or pre-determined to be attraction terms based, for example, on term clustering techniques and/or term similarity measures. Other techniques for identifying attraction queries can be used.

In some implementations, the search query that is specified by the search query data may be a non-commercial search query for the geographic location. When the search query is a non-commercial query, the set of targeting queries can be selected to include a commercial query with which the non-commercial search query is associated (i.e., to which the non-commercial query is indexed). For example, the commercial query (or queries) that have been associated with (e.g., indexed according to or otherwise stored with a reference to) the non-commercial query can be selected for inclusion in the set of targeting queries.

Eligible content items are selected based on the set of targeted queries (308). In some implementations, the eligible content items are content items that each have targeting criteria that are matched by the targeted queries that were selected for the geographic location. For example, assume that the set of targeted queries included the phrase "San Francisco flights." In this example, content items that were targeted to "San Francisco" and "flights" would be selected as eligible content items. In addition to selecting a content item that is targeted to "San Francisco" and "flights," other content items can be selected based on other targeting criteria that are matched by "San Francisco flights," as described with reference to FIG. 1.

Data that cause presentation of at least one of the eligible content items are provided (310). For example, the targeted query apparatus 120 can provide the query response 212 that includes ads responsive to the targeting queries based on the location San Francisco. The query response 212 can contain data, for example, for presenting the ads 214*a*-214*c* for display on the web page 208. In some implementations, providing query response data comprises providing query response data that specify the location of the advertisement. For example, the query response 212 can include location information (e.g., "San Francisco") so that when the ads 214*a*-214*c* are presented on the web page 208, they can include "San Francisco" in each ad.

Figure 4:
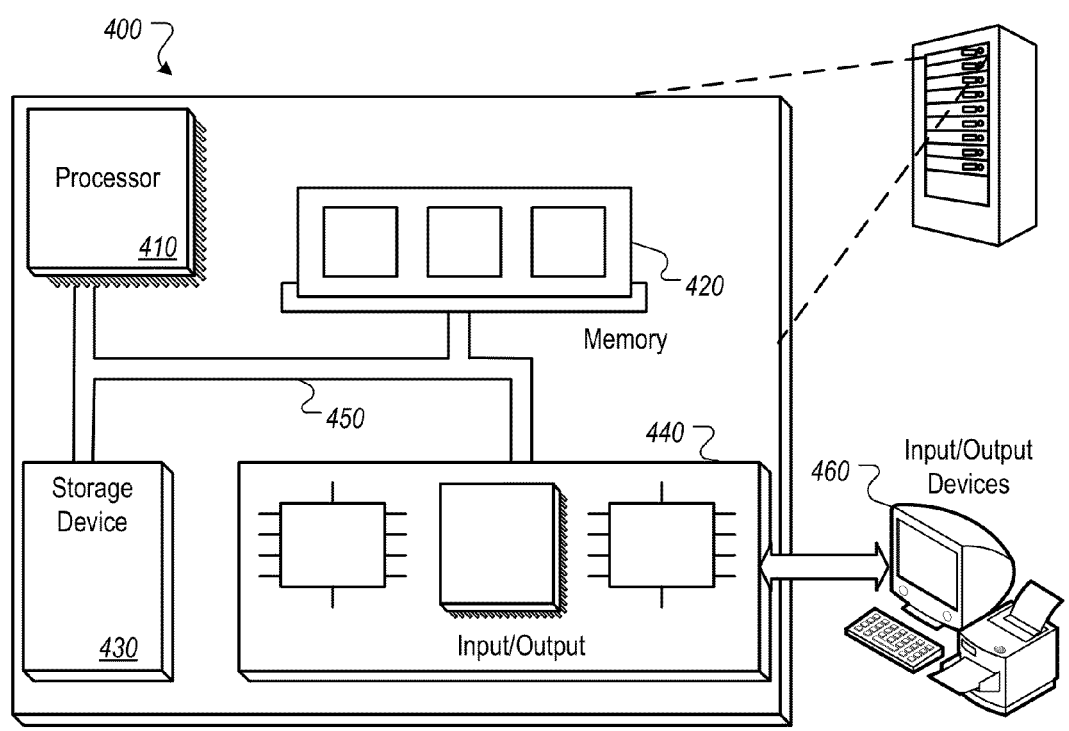
FIG. 4 is block diagram of an example computer system that can be used to provide images with a map portion.

FIG. 4 is block diagram of an example computer system 400 that can be used to provide images with a map portion, as described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    receiving a content item request requesting content items to be presented, at a user device, with search results for a first search query, the content item request including search query data specifying a geographic location that was referenced by the first search query and a search term of the first search query;
    determining, in response to receiving the content item request and by one or more data processing apparatus, that fewer than a threshold number of content items are eligible for presentation with search results responsive to the first search query;
    identifying, from a data store, in response to the determination that fewer than the threshold number of content items are eligible for presentation, and by one or more data processing apparatus, one or more terms that are each associated with at least the threshold number of content items that are eligible for presentation with search results responsive to search queries that include a reference to the geographic location, the one or more terms being different than the search term;
    selecting, for distribution in response to the received content item request and in response to the determination that fewer than the threshold number of content items are eligible for presentation with search results responsive to the first search query, one or more eligible content items using the one or more terms; and
    providing, in response to the received content item request, data that cause presentation, at the user device, of at least one of the one or more eligible content items selected using the one or more terms.

2. The method of claim 1, comprising receiving a set of targeted phrases that reference pre-defined local tourist attractions for the geographic location.

3. The method of claim 2, comprising classifying the first search query as an attraction query that is requesting information about the pre-defined local tourist attractions for the geographic location, wherein identifying the one or more terms comprises identifying one or more terms that reference the local tourist attractions for the geographic location.

4. The method of claim 1, comprising receiving commercial phrases for the geographic location, the commercial phrases being phrases that have caused presentation of at least a threshold number of content items on a per-content-item request basis.

5. The method of claim 4, comprising:
identifying a commercial query that includes both of a reference to the geographic location and a commercial search term, the commercial query being a query for which responsive search results pages include at least a minimum number of advertisements per-page, the commercial search term being a commercial phrase that is included in a query; and
selecting the commercial search term as one of the one or more terms for the geographic location.

6. The method of claim 5, comprising:
identifying a non-commercial query that does not qualify as the commercial query, the non-commercial query including a non-commercial search term and a reference to the geographic location; and
determining that a similarity score for the non-commercial search term meets a similarity threshold, the similarity score for the non-commercial search term being a measure of similarity between the non-commercial search term and the commercial search term; and
associating the non-commercial query with the commercial query.

7. The method of claim 6, wherein:
receiving a content item request comprises receiving search query data specifying the non-commercial query; and
identifying the one or more terms comprises selecting the commercial query that is associated with the non-commercial query as the one or more terms.

8. The method of claim 5, wherein identifying a commercial query comprises identifying a commercial query for which advertisements that are presented with the responsive search results pages have at least a minimum per-query click rate.

9. The method of claim 1, wherein:
selecting one or more eligible content items comprises selecting eligible advertisements; and
providing data that cause presentation of at least one of the one or more eligible content items comprises providing data that cause presentation of at least one of the eligible advertisements.

10. A non-transitory computer storage medium encoded with a computer program, the program comprising instructions that when executed by one or more data processing apparatus cause the one or more data processing apparatus to perform operations comprising:
receiving, from a user device, a content item request requesting content items to be presented, at a user device, with search results for a first search query, the content item request including search query data specifying a geographic location that was referenced by the first search query and a search term of the first search query;
determining, in response to receiving the content item request, that fewer than a threshold number of content items are eligible for presentation with search results responsive to the first search query;
identifying, from a data store and in response to the determination that fewer than the threshold number of content items are eligible for presentation, one or more terms that are each associated with at least the threshold number of content items that are eligible for presentation with search results responsive to search queries that include a reference to the geographic location, the one or more terms being different than the search term;
selecting, for distribution in response to the received content item request and in response to the determination that fewer than the threshold number of content items are eligible for presentation with search results responsive to the first search query, one or more eligible content items using the one or more terms; and
providing, in response to the received content item request, data that cause presentation, at the user device, of at least one of the one or more eligible content items selected using the one or more terms.

11. A system comprising:
a data store storing data identifying content items that are eligible for presentation with search results responsive to search queries that include a reference to the geographic location and one or more non geographic terms that are associated with each of the content items; and
one or more computers that interact with the data store and perform operations comprising:
receiving, from a user device, a content item request requesting content items to be presented, at a user device, with search results for a first search query, the content item request including search query data specifying a geographic location that was referenced by the first search query and a search term of the first search query;
determining, in response to receiving the content item request, that fewer than a threshold number of content items are eligible for presentation with search results responsive to the first search query;
identifying, in response to the determination that fewer than the threshold number of content items are eligible for presentation, one or more terms that are each associated with at least the threshold number of content items that are eligible for presentation with search results responsive to search queries that include a reference to the geographic location, the one or more terms being different than the search term;
selecting, for distribution in response to the received content item request and in response to the determination that fewer than the threshold number of content items are eligible for presentation with search results responsive to the first search query, one or more eligible content items using the one or more term; and
providing, in response to the received content item request, data that cause presentation, at the user device, of at least one of the one or more eligible content items selected using the one or more terms.

12. The system of claim 11, comprising a user device, wherein the one or more computers are configured to interact with the user device and provide the data that cause presentation of at least one of the one or more eligible content items to the user device.

13. The system of claim 11, wherein the one or more computers perform operations including receiving a set of targeted phrases that reference pre-defined local tourist attractions for the geographic location.

14. The system of claim 13, wherein the one or more computers perform operations including:
classifying the first search query as an attraction query that is requesting information about the pre-defined local tourist attractions for the geographic location, wherein identifying the one or more terms comprises identifying one or more terms that reference the local tourist attractions for the geographic location.

15. The system of claim 11, wherein the one or more computers perform operations including receiving commercial phrases for the geographic location, the commercial phrases being phrases that have caused presentation of at least a threshold number of content items on a per-content-item request basis.

16. The system of claim 15, wherein the one or more computers perform operations including:
- identifying a commercial query that includes both of a reference to the geographic location and a commercial search term, the commercial query being a query for which responsive search results pages include at least a minimum number of advertisements per-page, the commercial search term being a commercial phrase that is included in a query; and
- selecting the commercial search term as one of the one or more terms.

17. The system of claim 16, wherein the one or more computers perform operations including:
- identifying a non-commercial query that does not qualify as the commercial query, the non-commercial query including a non-commercial search term and a reference to the geographic location; and
- determining that a similarity score for the non-commercial search term meets a similarity threshold, the similarity score for the non-commercial search term being a measure of similarity between the non-commercial search term and the commercial search term; and
- associating the non-commercial query with the commercial query.

18. The system of claim 17, wherein the one or more computers perform operations including:
- receiving search query data specifying the non-commercial query; and
- identifying the one or more terms comprises selecting the commercial query that is associated with the non-commercial query as the one or more terms.

19. The system of claim 16, wherein the one or more computers perform operations including identifying a commercial query for which advertisements that are presented with the responsive search results pages have at least a minimum per-query click rate.

20. The system of claim 11, wherein the one or more computers perform operations including:
- selecting eligible advertisements based on the one or more terms; and
- providing data that cause presentation of at least one of the eligible advertisements.

* * * * *